(12) United States Patent
Corghi

(10) Patent No.: US 6,880,605 B2
(45) Date of Patent: Apr. 19, 2005

(54) SIMPLIFIED AUTOMATIC TIRE DEMOUNTING DEVICE, AND TIRE REMOVAL MACHINES EQUIPPED THEREWITH

(75) Inventor: Remo Corghi, Correggio (IT)

(73) Assignee: Corghi S.p.A., Correggio (IT)

( * ) Notice: Subject to any disclaimer, the term of this patent is extended or adjusted under 35 U.S.C. 154(b) by 0 days.

(21) Appl. No.: 10/632,910

(22) Filed: Aug. 4, 2003

(65) Prior Publication Data

US 2004/0055712 A1 Mar. 25, 2004

(30) Foreign Application Priority Data

Sep. 13, 2002 (IT) .................................... RE2002A0068

(51) Int. Cl.[7] .......................................... B60C 25/135
(52) U.S. Cl. .................................... 157/1.24; 157/1.26
(58) Field of Search ............................. 157/1.24, 1.26, 157/1.28, 1.17, 1.2, 1.22

(56) References Cited

U.S. PATENT DOCUMENTS

| | | | | | |
|---|---|---|---|---|---|
| 3,267,983 | A | * | 8/1966 | Furrer | 157/1.24 |
| 3,511,296 | A | * | 5/1970 | Center et al. | 157/1.24 |
| 5,226,465 | A | * | 7/1993 | Schon et al. | 157/1.24 |
| 6,408,921 | B1 | * | 6/2002 | Bonacini | 157/1.24 |
| 6,619,362 | B1 | * | 9/2003 | Corghi | 157/1.24 |
| 6,629,554 | B1 | * | 10/2003 | Mimura | 157/1.24 |

FOREIGN PATENT DOCUMENTS

| | | |
|---|---|---|
| EP | 1 177 920 A2 | 2/2002 |
| IT | RE2000A000078 | 2/2002 |

* cited by examiner

Primary Examiner—Hadi Shakeri
(74) Attorney, Agent, or Firm—Browdy and Neimark, P.L.L.C.

(57) ABSTRACT

Automatic device for demounting a tire from the relative wheel rim including a demounting tool. The demounting tool can be positioned in a tire bead seeking and gripping position where the axis of the demounting tool is parallel to that of the frame or the demounting tool is rotated a first direction towards the center of the wheel rim. The tool can be positioned for extracting tire bead from the wheel rim in which the axis of the demounting tool is parallel to that of the frame or rotated a direction opposite to the first direction. The device further including a bar, to the end of which the tool is hinged in an intermediate position, and a connecting rod which at one end is hinged to one end of the tool, and at the opposite end is connected to the bar by a lever linkage, the bar being connected to an actuator for advancing it and withdrawing it.

9 Claims, 8 Drawing Sheets

SIMPLIFIED AUTOMATIC TIRE DEMOUNTING DEVICE, AND TIRE REMOVAL MACHINES EQUIPPED THEREWITH

BACKGROUND OF THE INVENTION

1. Technical Field of the Invention

This invention relates generally to those means, installed on tyre removal machines, which enable the tyre to be demounted from the wheel rim.

2. Prior Art

Devices are known which, associated with rotary means for supporting the wheel rim, enable the tyre to be extracted from the wheel rim without the active intervention of the operator during the operation. One of these devices is fully described in patent application RE2000A000078 filed in to the name of the same applicant, to the text of which reference should be made for a fuller understanding of the known art.

Briefly the device described on said patent application comprises an operative head provided at least with a demounting tool, which can rotate about the main axis of said operative head, and arranged to interact with is the edge of the tyre to grip the tyre bead and extract it from the bead retention seat in the edge of the wheel rim, to enable the tyre to be extracted from the wheel rim.

Although the device perfectly performs the operations for which it is intended, it has proved costly because of complicated construction.

OBJECT AND SUMMARY OF THE INVENTION

The object of this invention is therefore to overcome the drawbacks of the known art within the context of a rational and reliable solution which is of simple and economical construction.

The invention attains said object by an automatic device for demounting the tyre from the wheel rim which, associated with rotary means for supporting the wheel rim, is able to extract the tyre from the wheel rim without requiring any intervention by the operator.

Said device comprises a demounting tool which is associated with means enabling it to be positioned in a tyre bead seeking and gripping position in which the tool is perpendicular to the axis or orientated towards the centre of the wheel rim, and in a position for extracting said tyre bead from the wheel rim, in which the tool is perpendicular to the axis or orientated in the opposite direction. Specifically, said positioning means comprise a bar, to the end of which said tool is hinged in an intermediate position, and a connecting rod which at one end is hinged to one end of said tool, and at the opposite end is connected to said bar by a lever, said bar being connected to means for advancing it and withdrawing it.

In a first embodiment of the invention, said connecting rod is of variable length and comprises a cylinder-piston unit, such that when the tool is positioned in the tyre bead seeking and gripping position, it is orientated towards the centre of the wheel rim.

In a simplified version of the invention, said connecting rod is of fixed length, such that when the tool is in said tyre bead seeking and gripping position, it is perpendicular to the axis of said bar.

According to the invention the rotary means for supporting the wheel rim can translate horizontally to approach and withdraw from the device of the invention on the basis of the wheel rim diameter and possibly of the operative position assumed by the demounting tool.

Finally, combining the device of the invention with said rotary means for supporting the wheel rim results in an assembly representing a complete tyre removal machine, which could be provided with a bead release device.

BRIEF DESCRIPTION OF THE DRAWINGS

The constructional and operational characteristics of the invention will be apparent from the ensuing description of a preferred embodiment thereof given by way of non-limiting example and illustrated in the accompanying drawings.

DETAILED DESCRIPTION OF THE PREFERRED EMBODIMENT(S) OF THE INVENTION

Said figures show the tyre removal machine 1 comprising a lower casing 2, from which there upperly emerges a rotary shaft 3 for supporting the support and locking means 4 for the wheel rim 5 on which the tyre 6 is installed.

The shaft 3, and hence the support and locking means 4 for the wheel rim 5, can translate axially, being operated by suitable operating means positioned within the casing 2.

Said support and locking means 4 and said operating means for the shaft 3 are not described in detail as they are known.

To the rear of the casing 2 there is present a vertical frame 7 provided with slide guides 70 for a carriage 8 arranged to support the device 9 of the invention.

The carriage 8 can translate vertically by virtue of a known male-female screw mechanism 300, being provided with wheels 81 travelling along guides 70 on the frame 7.

The device 9 comprises a tool 15 for automatically demounting the tyre 6 from the wheel rim 5. The device 9 comprises means 100 for positioning the tool 15 in a first tyre bead seeking and gripping position in which the tool 15 is orientated towards the centre of the wheel rim, and means 200 enabling the tool 15 to be positioned in a second position for extracting said tyre bead from the wheel rim 5, in which the tool 15 is perpendicular to the axis of the device 9 or is orientated towards the frame 7.

Said tool operating means 200 comprise a first cylinder-piston unit 10 composed of a cylinder 11 within which there slides a piston 12, the piston rod 13 of which emerges from the interior of the cylinder and is fixed to a bar 14 which slides within a prolongation 110 of the cylinder.

The tyre demounting tool 15 is rotatable around a pivot (26) hinged to the free end of the bar 14. Said tool 15 is substantially of hook shape and upperly presents two lugs 150 between which said tool operating means 100 are connected.

Said operating means 100 comprise a second cylinder-piston unit 16 composed of a cylinder 17 externally hinged to said lugs and containing a sliding piston 18, the piston rod 19 of which emerges from the cylinder 17. The free end of the piston rod 19 is fixed to the end of a profiled plate 20 which slides on the upper surface of the prolongation 110 of the cylinder 11. To the opposite end of the plate 20 there are hinged a pair of levers or arms 21 positioned at the sides of the prolongation 110 of the cylinder 11 and hinged at their opposite end via a slot 210 to an appendix 22, which branches from the prolongation 110 of the cylinder 11.

Figure 1:
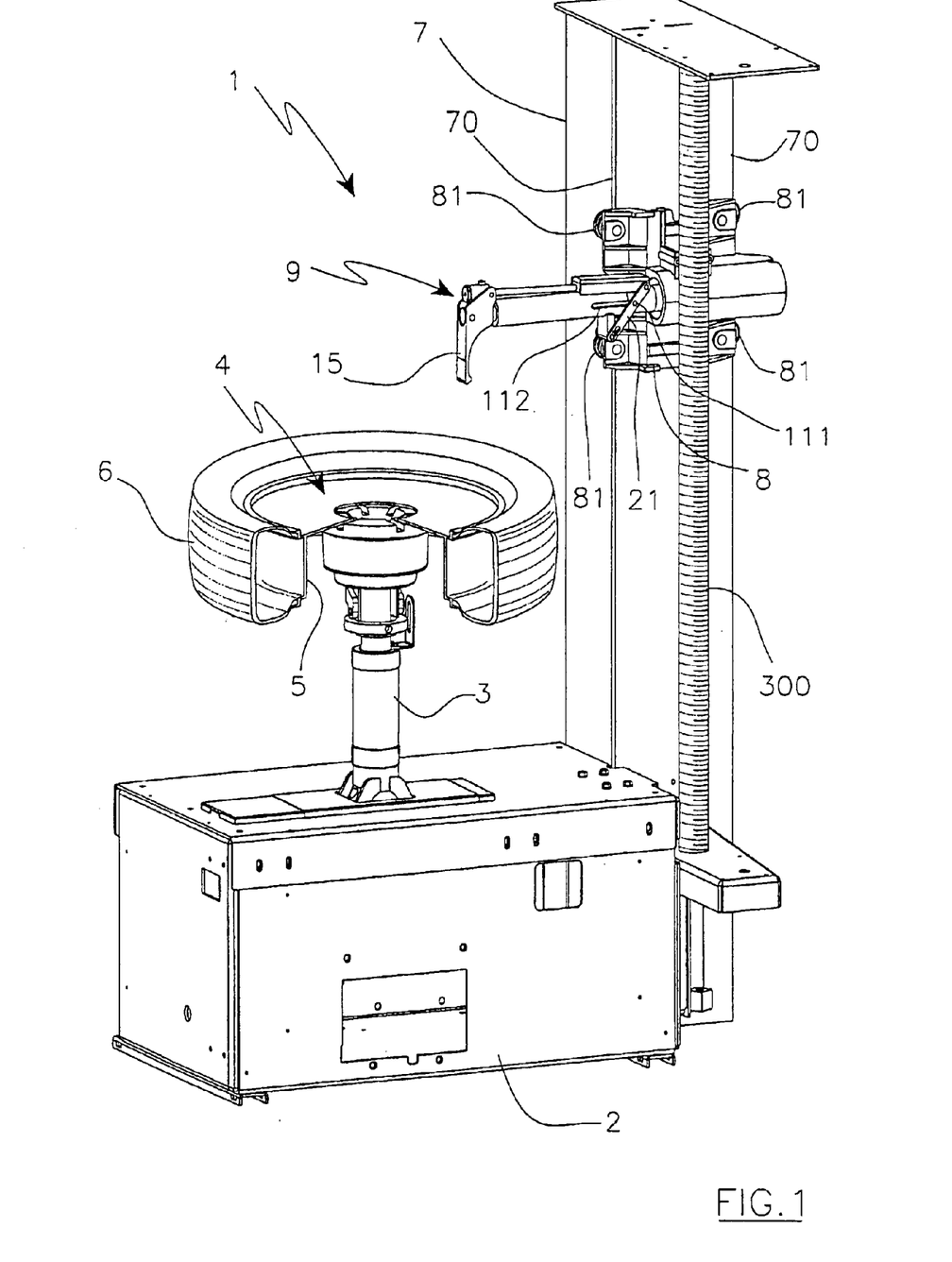
FIG. 1 is a perspective view of the tyre removal machine on which the invention is installed.
Figure 2:
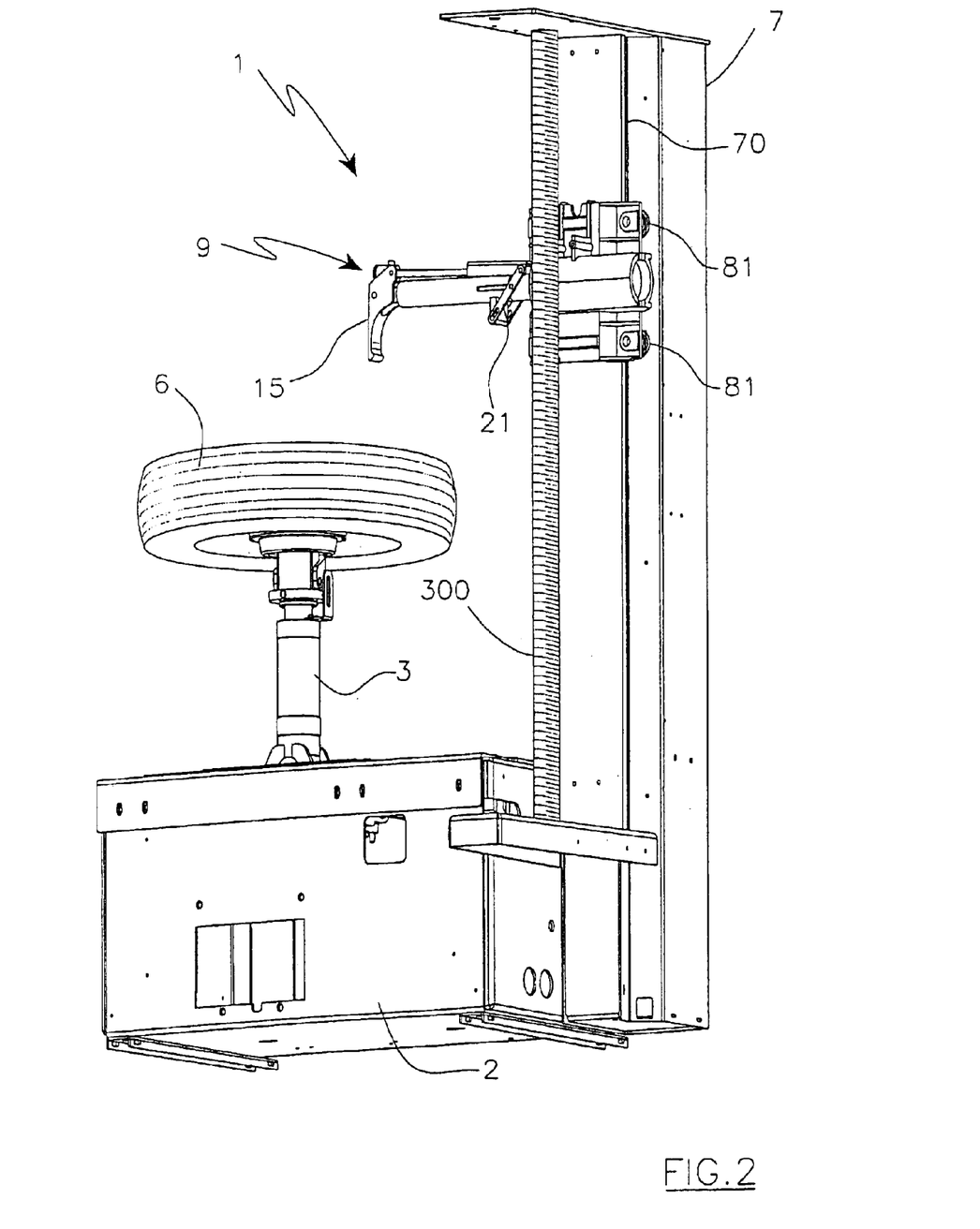
FIG. 2 is a second perspective view of the tyre removal machine on which the invention is installed.
Figure 3:
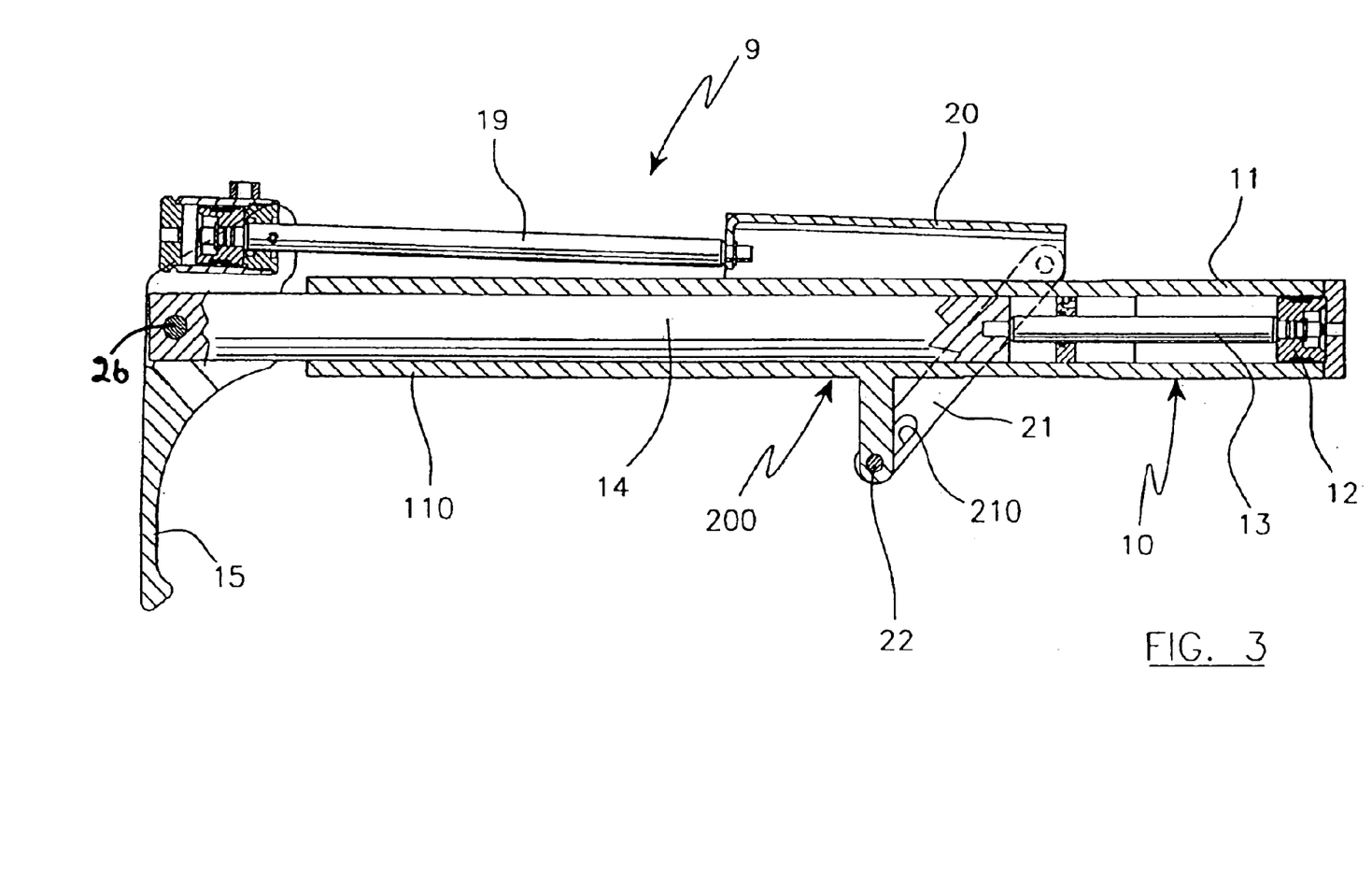
FIG. 3 is a partly sectional view of the device of the invention in a first operative position.
Figure 4:
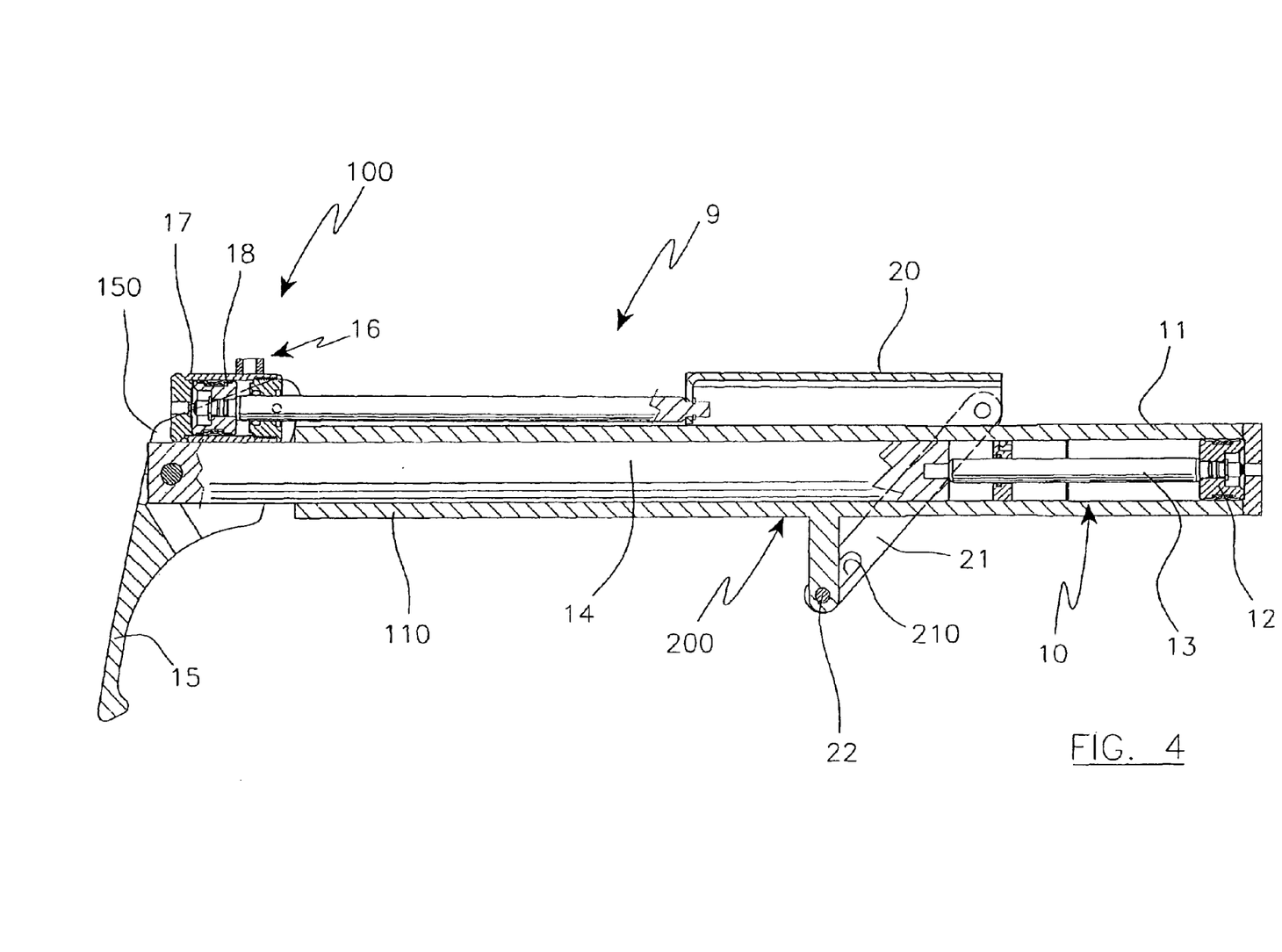
FIG. 4 is a partly sectional view of the device of the invention in a second operative position.

Again with reference to FIG. 1, each of the levers 21 is pivoted at its centre to a pin 111 on the bar 14, which emerges from a respective slot 112 on the prolongation 110.

Figure 10:
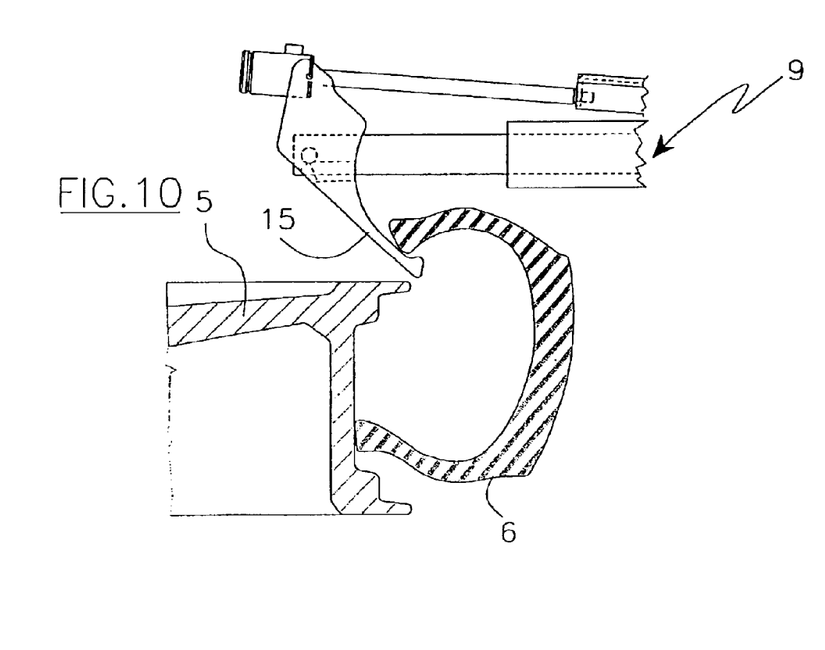

The two levers or arms 21 enable the tool 15 to be positioned in said second extraction position shown in FIG. 10.

Figure 5:
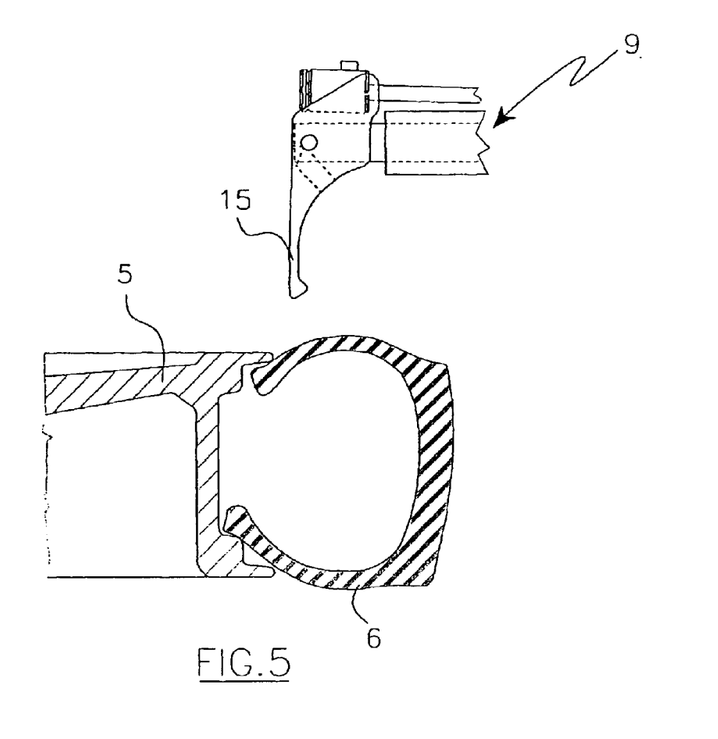
FIGS. 5 to 10 are schematic views of the invention during the demounting of the tyre from the wheel rim.

The operation of the invention can be controlled by the operator via suitable control means, not shown, positioned on the casing 2 of the tyre removal machine, or can be controlled automatically by a processor. After releasing the tyre bead and locking the wheel in position, the operator adjusts the position of the shaft 3 relative to the frame 7 on the basis of the wheel diameter. At this point the operator operates the device 9 to move it into the position shown in FIG. 5, i.e. he positions the demounting tool 15 in proximity to the wheel rim edge, at a few millimeters therefrom.

Figure 6:
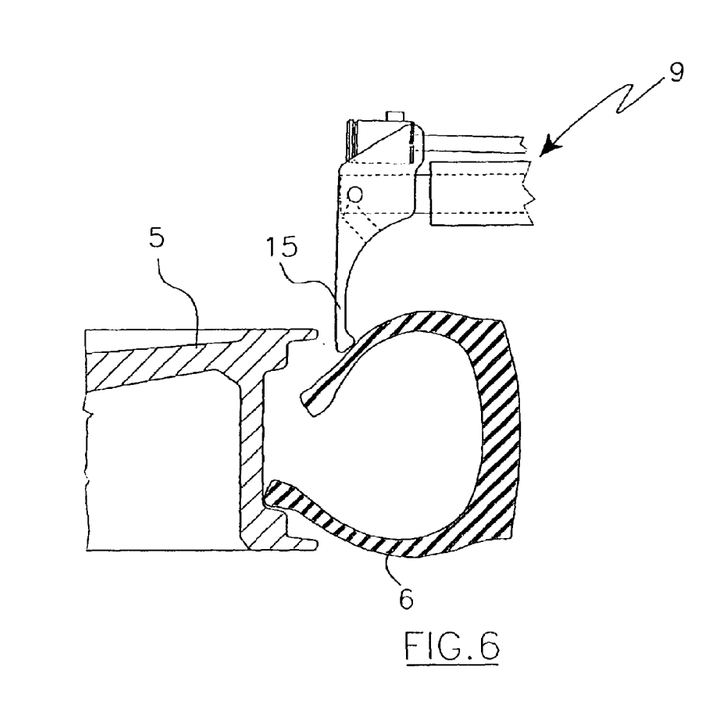

When in this position the device 9 is lowered by a predetermined amount as shown in FIG. 6, and its hook-shaped lower end is inserted between the bead retaining flange on the wheel rim and the sidewall of the tyre.

Figure 7:
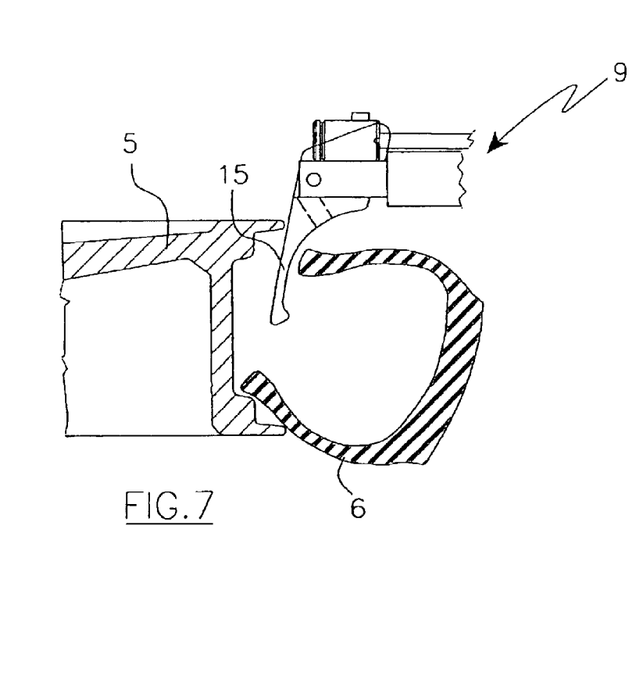

When in position, the tool is brought into the bead seeking and gripping position (FIG. 7) by rotating it about the vertical axis through a predetermined angle in the direction of the wheel rim axis, so that the hook-shaped end of the tool 15 grips the edge of the tyre bead.

Figure 8:
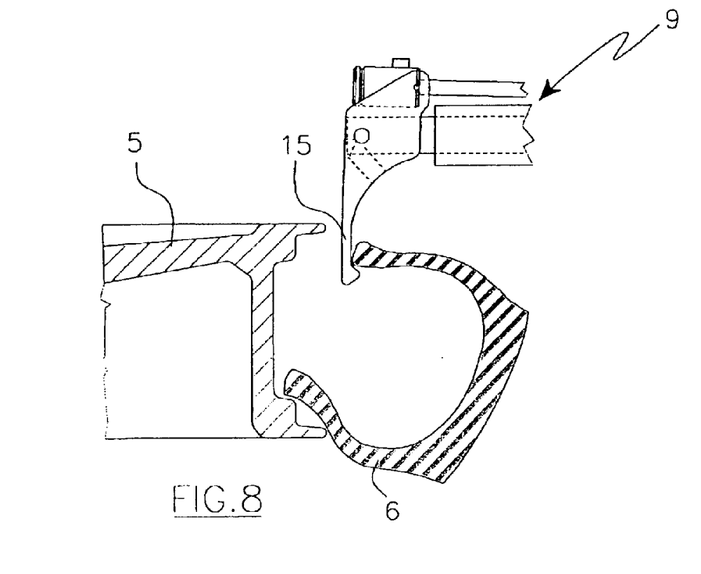
Figure 9:
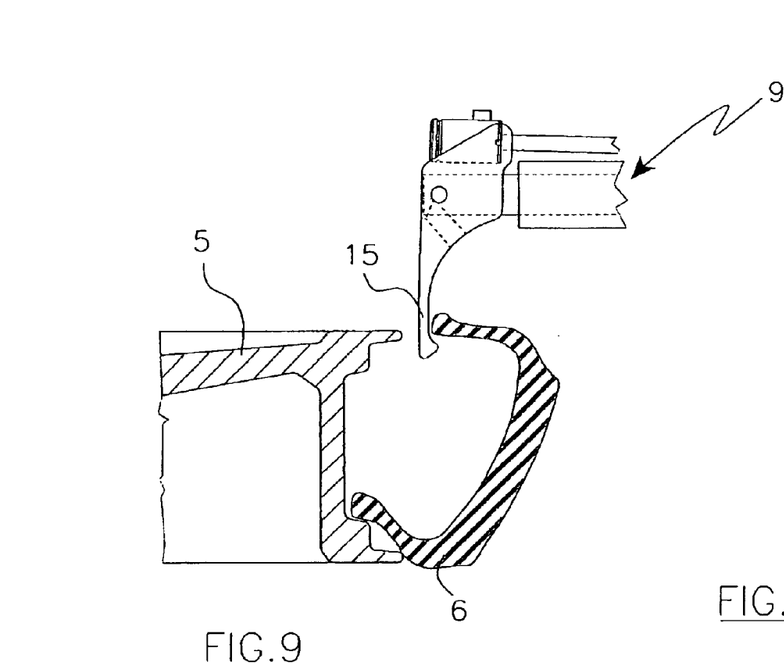

With reference to FIG. 8 the tool is then brought into the first extraction position coinciding with the (vertical) rest position. From this position the device 9 is raised, as shown in FIG. 9, in order to extract a portion of the upper tyre bead to above the wheel rim.

At the same time the wheel rim is rotated so that the entire upper tyre bead leaves the wheel rim.

It should be noted that during the entire tyre demounting operation the tool 15 never touches the wheel rim edge, hence there is no risk of damaging this edge.

When the upper tyre bead has been extracted, the tool is positioned in the seeking position to release the tool from it, after which the tool is returned to its rest position.

To facilitate the escape of the tyre bead from the wheel rim and reduce the stresses to which the bead is subjected, the tool 15 can be positioned in said second extraction position (FIG. 10) by the action of the cylinder-piston unit 10, as soon as the tyre upper bead has been gripped in the described manner and a part thereof extracted from the wheel rim edge. Operating the cylinder-piston unit 10 causes the bar 14 to translate axially, and with it the profiled plate 20 which, because of the mechanism by which it is secured to the bar 14, advances by a greater amount than the bar to cause the tool to rotate into said second extraction position.

When the tool is in position the wheel rim is rotated so that the entire upper bead escapes from the wheel rim.

Figure 11:
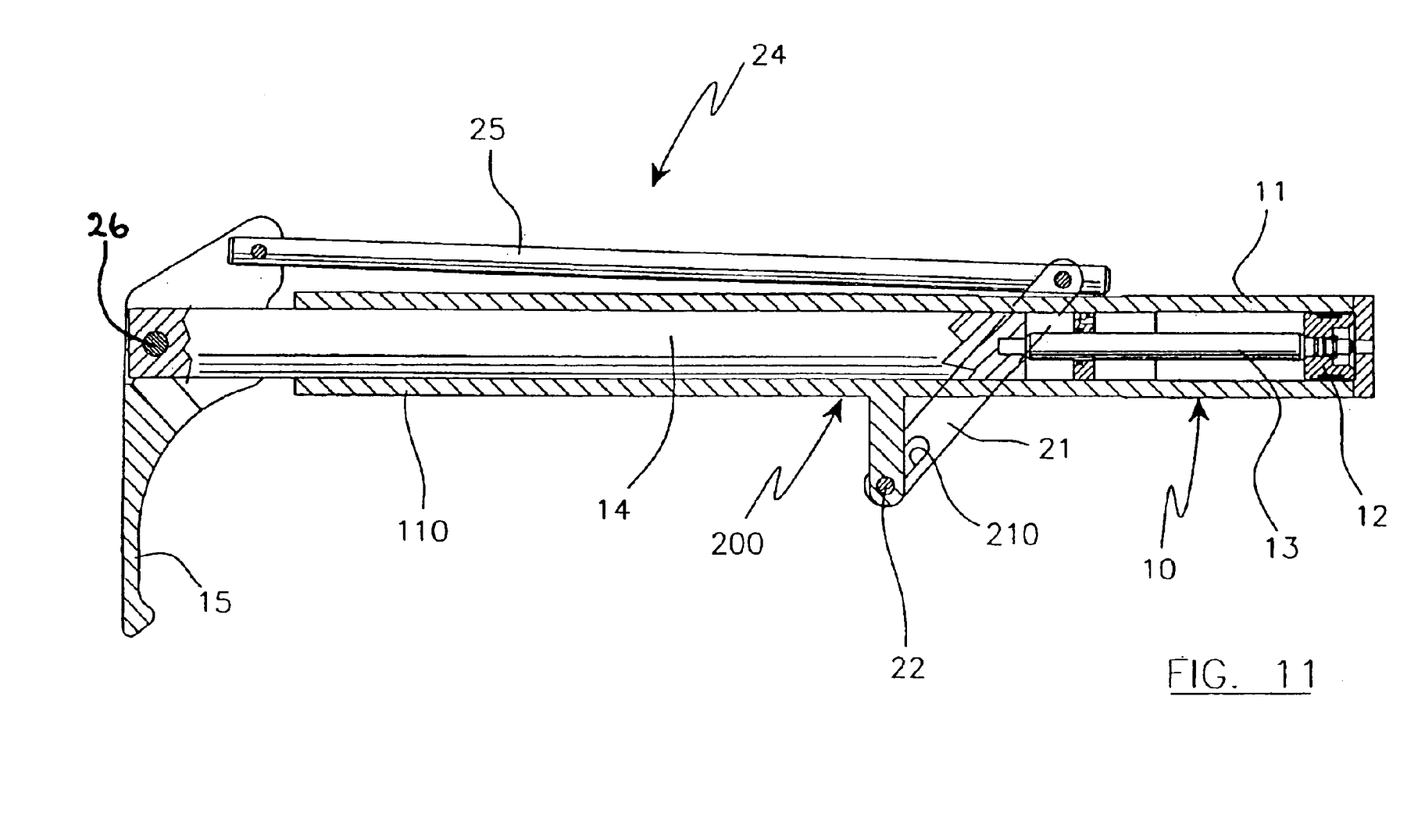
FIG. 11 is a partly sectional view of a variant of the invention in a first operative position.

FIG. 11 shows a simplified variant of the invention, which is suitable for use, for example, in demounting large diameter tyres.

In the description of this variant the same reference numerals are used to indicate components identical to those already described.

The automatic tyre demounting device 24 of this simplified variant differs from the preceding in that the position for seeking and gripping the tyre bead requires the tool to be maintained perpendicular to the axis, rather than orientated towards the centre of the wheel rim as in the preceding embodiment.

Consequently, as can be seen from FIG. 11, the tool 15 is connected to the lever 21 by a connecting rod 25.

The operation of this variant of the invention is similar to that described, but with the difference that the tyre bead is sought and gripped while maintaining the tool perpendicular to the device axis.

What is claimed is:

1. An automatic device for demounting a tire (6) from a wheel rim (5), comprising:
    a frame (7) defining a longitudinal axis,
    rotary and support means (3, 4) for rotating and supporting the wheel rim and the tire, said means being associated with said frame,
    a demounting tool (15) rotatable around a pivot (26) located on a bar (14) and on an intermediate portion of said tool (15), the tool (15) operatively connected to a first positioning/operating means (100) for positioning said tool in a seeking and first gripping position in which the tool is parallel to said longitudinal axis or rotated around the pivot in a first direction towards the center of the wheel rim for gripping a tire bead, and a second positioning/operating means (200) for operating said tool for extracting said tire bead from the wheel rim in which the tool is positioned parallel to said longitudinal axis or rotated around the pivot in a direction opposite to said first direction,
    said first positioning/operating means further including a connecting rod (19, 25), and wherein one end of said tool is hinged to said connecting rod, an opposite end of said connecting rod being coupled to said bar by a lever linkage (21), and
    said second positioning/operating means further including an advancing and withdrawing means (10), and wherein said bar (14) further being fixed to said advancing and withdrawing means.

2. A device as claimed in claim 1, wherein said connecting rod (16, 20) is of variable length.

3. A device as claimed in claim 2, wherein said connecting rod (19, 20) of variable length enables said tool (15) to be positioned in that seeking position in which it is orientated towards the wheel rim center.

4. A device as claimed in claim 2 or 3, wherein said connecting rod of variable length comprises a cylinder-piston unit (16).

5. A device as claimed in claim 1, wherein said means for advancing and withdrawing said bar (14) comprise a cylinder-piston unit (10).

6. A device as claimed in claim 5, wherein said bar (14) slides within a prolongation (110) of the cylinder of said cylinder-piston unit (10), the rod of said unit (10) being hinged to said bar (14) by a pair of levers (21) which at their opposite end are hinged via a slot (210) to an appendix (22) branching from the prolongation (110) of the cylinder (11).

7. A device as claimed in claim 1, wherein said means for advancing and withdrawing said bar (14) comprise a cylinder-piston unit (10) associated with a carriage (8) which translates vertically on said frame (7).

8. A device as claimed in claim 7, wherein said carriage (8) is driven in translation by a male-female screw system.

9. A device as claimed in claim 1, wherein said demounting tool (15) presents a hook-shaped lower portion for gripping the bead of the tire (6).

* * * * *